United States Patent [19]

Ludwig et al.

[11] 3,874,677
[45] Apr. 1, 1975

[54] HIGH SPEED, SELF-ACTING SHAFT SEAL

[75] Inventors: Lawrence P. Ludwig, Fairview Park; William F. Hady, Cleveland Heights, both of Ohio

[73] Assignee: The United States of America as represented by the National Aeronautics and Space Administration, Washington, D.C.

[22] Filed: July 19, 1973

[21] Appl. No.: 380,630

[52] U.S. Cl. .................. 277/27, 277/40, 277/134
[51] Int. Cl. ............................................. F16j 15/16
[58] Field of Search .............. 277/27, 40, 134, 67

[56] References Cited
UNITED STATES PATENTS

| | | | |
|---|---|---|---|
| 1,326,064 | 12/1919 | Keller | 277/27 |
| 1,331,360 | 2/1920 | Parsons et al. | 277/27 |
| 1,999,094 | 4/1935 | Godron | 277/27 |
| 3,119,623 | 1/1964 | Schevchenko | 277/27 X |
| 3,259,393 | 7/1966 | Dega | 277/134 |
| 3,333,855 | 8/1967 | Andresen | 277/40 |
| 3,364,523 | 1/1968 | Schippers | 277/134 |
| 3,617,068 | 11/1971 | Sprenger | 277/134 |

Primary Examiner—Samuel B. Rothberg
Attorney, Agent, or Firm—N. T. Musial; G. E. Shook; John R. Manning

[57] ABSTRACT

A high-speed, self-acting circumferential type shaft seal for use in turbine engines is disclosed. One or more conventional circumferential ring seals having a central aperture are mounted in a housing. In three of the four embodiments of the invention, a helical groove and one or more dam seals are cut in the inner cylindrical surface of the one or more ring seals. In a fourth embodiment, two or more lift pads are disposed in surface contact with the inner cylindrical surface of the seal rings. To the outside of the lift pads, two dam seals are cut in the inner cylindrical surface of two of the ring seals. In each of the embodiments, a net outward radial force is produced during rotation of the turbine causing the ring seals to lift out of contact with the turbine shaft to minimize wear of the ring seals.

9 Claims, 4 Drawing Figures

HIGH SPEED, SELF-ACTING SHAFT SEAL

ORIGIN OF THE INVENTION:

The invention described herein was made by employees of the United States Government and may be manufactured and used by or for the Government for governmental purposes without the payment of any royalties thereon or therefore.

BACKGROUND OF THE INVENTION

1. Field of the Invention

The invention relates to low-wear, self-acting circumferential ring seals of the type used in turbine engines to seal a rotating shaft between high and low pressure areas.

2. Description of the Prior Art

Prior art ring seals of the circumferential type consist of a housing containing one or more carbon ring segments which have an inner cylindrical surface that rides on the rotating outer cylindrical surface of the turbine shaft.

The primary disadvantage of the prior art construction is that high speed contact between the cylindrical surfaces of the shaft and the ring seal result in high wear and expensive replacement. Since the cost of the prior art ring seals is relatively expensive, it is easy to see that increased longevity has a distinct advantage.

SUMMARY OF THE INVENTION

The disadvantages of the prior art ring seal are solved by the instant invention which provides a relatively inexpensive solution to the problem of ring seal wear. The longevity of ring seals constructed according to the invention is up to ten times or longer than prior art ring seals depending on the operating conditions to which the ring seal is subjected.

The invention consists of a housing within which is mounted one or more circumferential type ring seals having a central aperture. The inner surface of the aperture is cylindrical in shape and is adapted to be disposed around a high-speed rotating shift. Three of the embodiments of the invention have a helical groove of constant cross-sectional area cut in the inner cylindrical surface of the one or more ring seals. One portion of the helical groove is coupled to a high pressure area partially surrounding the housing. One or more dam seals project radially inward from the inner cylindrical surface of the ring seal and are disposed between a low pressure area partially surrounding the housing. In the case where the high pressure area is filled with a compressible fluid such as air, the helical groove produces an increasing pressure gradient between the high pressure area and the dam seal. This resultant pressure gradient produces a net outward radial force which lifts the ring seal out of contact with the shaft during rotation thereof. A small amount of air leakage between the dam seal and the shaft into the low pressure area maintains a constant lifting force which is balanced by garter springs holding the ring seals in place around the shaft. In a fourth embodiment, the helical groove is replaced by one or more lift pads having a central aperture therein forming an inner cylindrical surface adapted to be disposed around the rotating shaft. Each lift pad has a channel disposed therein. The cross-sectional shape of the lift pad defined from a radial direction with respect to the aperture is a rectangle with a smaller cut-out cross-section having one of its edges in common with the inner cylindrical surface of the lift pad. The smaller cut-out cross-section does not border on any of the corners of the rectangular cross-section. The rotation of the shaft causes drag to occur between the air molecules in the smaller cut-out cavity of the lift pad and the walls of the cavity. This drag draws air into the cavity from the high pressure area surrounding the lift pad to produce a net outward radial force which lifts the lift pad and ring seal out of contact with the shaft during rotation thereof.

DETAILED DESCRIPTION OF THE INVENTION

Figure 1:
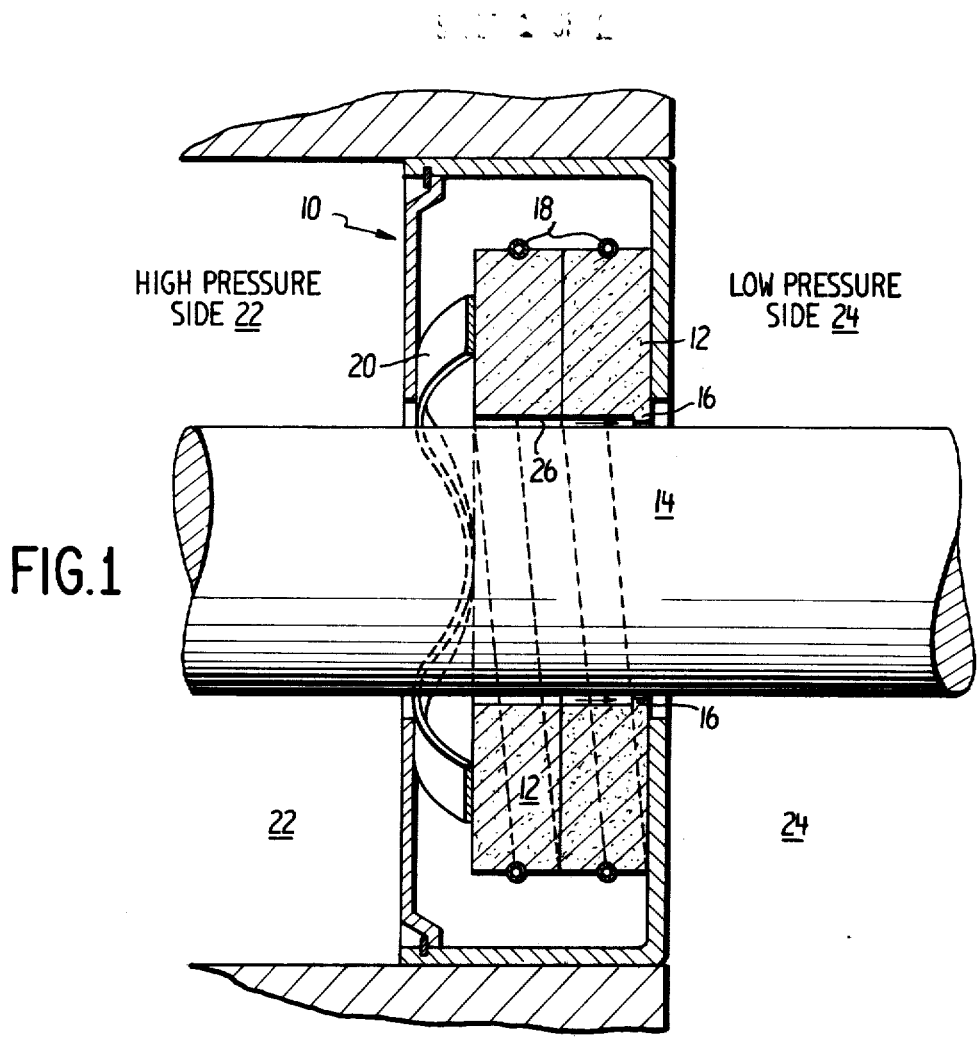
FIG. 1 is a sectional view of a first embodiment of the invention.
Figure 2:
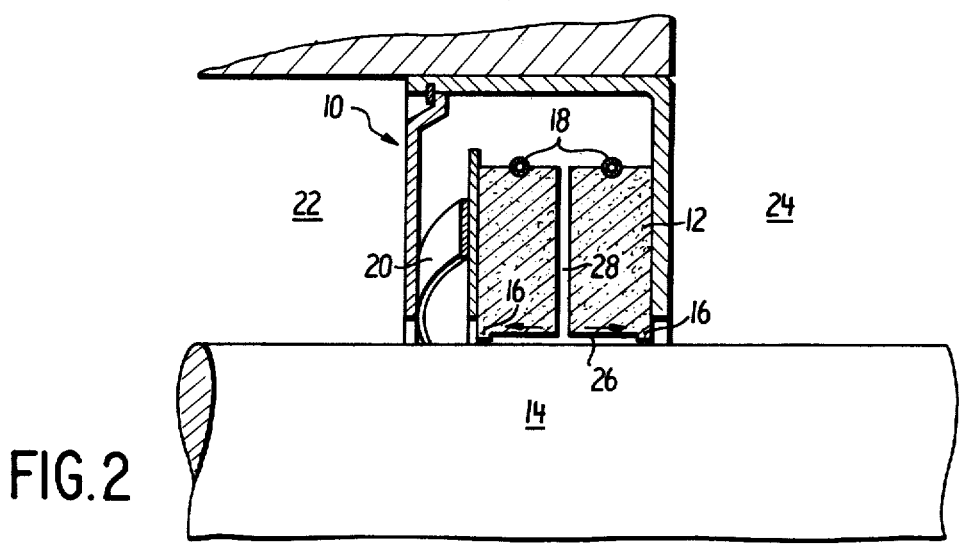
FIG. 2 is a sectional view of a second embodiment of the invention.
Figure 3:
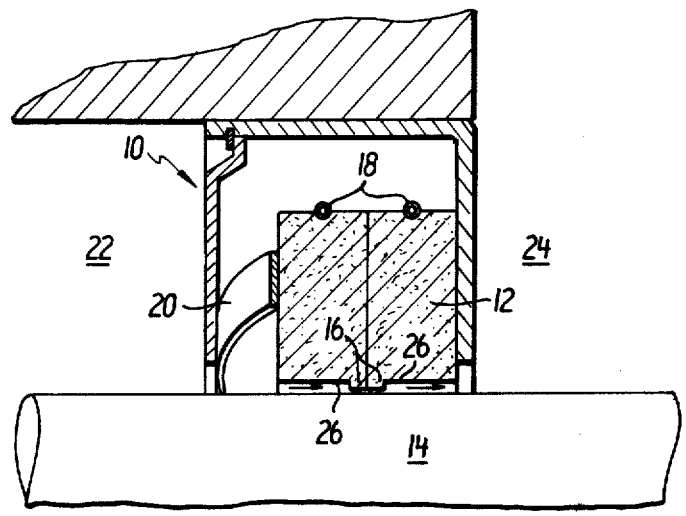
FIG. 3 is a sectional view of a third embodiment of the invention.
Figure 4:
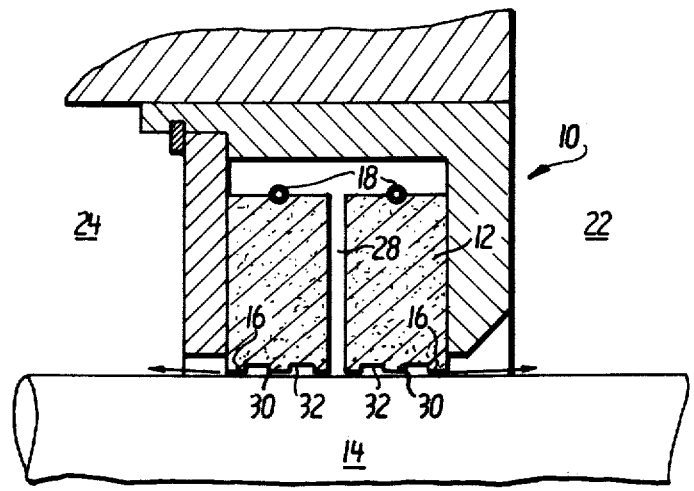
FIG. 4 is a sectional view of a fourth embodiment of the invention.

In FIGS. I through IV, housing 10 contains one or more split rings 12 constructed from carbon or other suitable materials. Split rings 12 have an aperture forming an inner cylindrical surface (not shown for the sake of clarity) adapted to be disposed around rotatable shaft 14. One or more of the split rings 12 have a radially inward projecting dam seal 16. While shaft 14 is at rest, each of the split rings 12 is biased against the surface thereof by an associated garter spring 18. A suitable spring 20 (FIGS. I through III) may be provided to hold the split rings 12 in positive axial position with respect to shaft 14. Surrounding housing 10 is high pressure area 22 (characteristically in the compressor section of a turbine) and low pressure area 24.

Referring to FIG. I, disposed on the inner cylindrical surface of split rings 12 is a helical groove 26 of constant cross-sectional area. The direction of turn of the helix 26 is such that it causes a compressible fluid (characteristically air) to be pumped from left to right toward dam seal 16. The pumping action of helical groove 26 causes a positive pressure gradient to be produced between high pressure side 22 and dam seal 16. Because of the presence of the high pressure area 22 on the outer cylindrical surface of the split rings 12, around garter springs 18, etc., a net uniformly-distributed outward radial lifting force is produced by the pressure gradient. The net outward radial lifting force causes split rings 12 to lift out of contact with shaft 14 during rotation thereof. A small amount of the compressible fluid present in the high pressure area 22 leaks between the cylindrical faces of the dam seal 16 and shaft 14. This leakage maintains a relatively constant lifting force on the split rings 12.

Referring to FIG. II, slot 28 is coupled to high pressure area 22. A helical groove 26 is provided on the inner cylindrical surface of split rings 12. The direction of turn of helical groove 26 is such that a positive pressure gradient is established between slot 28 which is coupled to a source of compressible fluid such as air and dam seals 16 causing a net uniformly-distributed outward radial force to lift split rings 12 out of contact with shaft 14 during rotation thereof.

Referring to FIG. III, a helical groove 26 is provided on the inner cylindrical surface of split rings 12. The direction of turn of the helical groove 26, which is coupled to high pressure area 22, is such that a positive pressure gradient is established between the high pressure area 22 and the dam seal 16 disposed on the left hand side of split ring 12. The direction of turn of the helical groove 26 which is coupled to low pressure area 24 is such that oil in the low pressure area 24 is pumped out of the space between the righ hand helical groove 26 and shaft 15 and into the oil reservoir located in low pressure area 24. The pumping action by the right hand helical groove 26 produces a uniformly-distributed net outward radial force which lifts the right hand split ring 12 out of contact with shaft 14 during rotation thereof.

Referring to FIG. IV, it should be noted that those parts which are the same as FIG. II will not be discussed as they have been adequately described supra. The difference between the first three embodiments and this embodiment is in the substitution of circumferentially spaced lift pads 30 in place of helical grooves 26. The lift pads 30 are formed on the inner cylindrical surface of the split rings 12 disposed around the shaft 14. The lift pads 30 are separated by axially extending channels. Each pad has a recess 32 disposed therein. The cross-sectional shape of the lift pad defined from a radial direction with respect to the aperture is rectangular with a smaller cut-out recess 32 having one of its edges in common with the adjacent axially extending channel. The recess 32 does not border on any of the corners of the rectangular cross-section of the lift pad. Rotation of shaft 14 causes the recess 32 and the shaft 14 to function as a drag pump causing the compressible fluid (usually air) to be drawn into recess 32 from the adjacent axially extending channel. This phenomenon is readily explained by fluid dynamics. The drawing of the compressible fluid into recess 32 causes net outward radial force to lift ring seals 12 out of contact with shaft 14 during rotation thereof.

With respect to FIGS. I through III, it should be noted that grooves 26 are of constant cross-sectional area. The pitch of the helical groove 25 and the cross-sectional area is empirically determined. However, the viscosity of the fluid being pumped is an important factor in the design. In the case of air, the groove depth is in the range of one-half to one mil in depth.

While all of the embodiments are shown with two split rings, it will be apparent to those skilled in the art that a greater or lesser number of split rings could be used with equal facility.

To produce a greater lifting force, it is possible to cut a channel in the inner cylindrical surface of the dam seals and couple that channel with the high pressure gradient produced by helical groove 26 or lift pad 30 by means of a helical groove 26 or other type of suitable port. For the sake of clarity, this feature has not been shown in the drawings.

With respect to FIGS. I through III, it should be noted that while it is preferable to dispose helical groove 26 on the inner cylindrical surface of split rings 12, the helical groove may also be disposed on the outer cylindrical surface of shaft 14.

It is therefore to be understood that within the scope of the appended claims, the invention may be practiced otherwise than as specifically described herein.

What is claimed as new and desired to be secured by Letters Patent of the United States is:

1. A high-speed, self-acting shaft seal for use in sealing a rotating shaft between high and low pressure areas, the combination comprising:

a housing;

at least one ring seal disposed in said housing, said at least one ring seal having an aperture therein forming an inner cylindrical surface adapted to be disposed around said rotating shaft;

a dam seal at one end of said inner cylindrical surface of said at least one ring seal, and means coupled to said cylindrical surface of said at least one ring seal adjacent to said dam seal for producing a net outward radial force only during rotation of said shaft whereby said inner cylindrical surface lifts out of surface contact with said shaft during rotation thereof.

2. A high-speed, self-acting shaft seal as recited in claim 1 wherein said means coupled to said inner cylindrical surface comprises:

a helical groove cut in said inner cylindrical surface of said at least one ring seal;

said helical groove extending from said high pressure area to said dam seal said dam seal forming a portion of said inner cylindrical surface;

said helical groove producing an increasing pressure gradient from said high pressure area to said dam seal during rotation of said shaft; and said dam seal being disposed between said low pressure area and said helical groove.

3. A high-speed, self-acting shaft seal as recited in claim 1 wherein at least two seal rings are disposed in said housing, said means coupled to said inner cylindrical surface comprising:

a pair of said dam seals, each dam seal being at one end of said cylindrical surface of a different one of said seal rings;

each of said dam seals forming a portion of said inner cylindrical surface;

a slot coupled to said high pressure area and being disposed between two of said at least two ring seals;

a helical groove cut into said ring seals and extending from said slot to said pair of dam seals, said helical groove producing an increasing pressure gradient from said slot to said dam seals during rotation of said shaft; and said dam seals being respectively disposed between said high pressure area and one end of said helical groove and said low pressure area in the other end of said helical groove.

4. A high-speed, self-acting shaft seal as recited in claim 1 wherein at least two ring seals are disposed in said housing, said means coupled to said inner cylindrical surface comprising:

a pair of dam seals disposed in surface contact with each other;

each dam seal being at one end of said cylindrical surface of a different one of said ring seals;

each of said dam seals forming a portion of said inner cylindrical surface;

a first helical groove extending from said high pressure area to one of said dam seals, said first helical groove producing an increasing pressure gradient from said high pressure area to said one of said dam seals during rotation of said shaft;

a second helical groove extending from the other of said dam seals to said low pressure area, and said low pressure area being adapted to be immersed within a liquid such as oil, whereby said second helical groove forces said liquid from said other dam seal to said low pressure area during rotation of said shaft.

5. A high-speed, self-acting shaft seal as recited in claim 1 wherein at least two seal rings are disposed in said housing, said means coupled to said inner cylindrical surface comprising:
   a pair of dam seals;
   each dam seal being at one end of said cylindrical surface of a different one of said seal rings;
   each of said dam seals forming a portion of said inner cylindrical surface;
   a slot coupled to said high pressure area and being disposed between two of said at least two seal rings;
   a plurality of lift pads being respectively disposed between said slot and one of said dam seals and said slot and the other of said dam seals; and
   said dam seals being disposed respectively between said high pressure area and one of said lift pads and said low pressure area and the other said lift pads.

6. A high-speed, self-acting shaft seal as recited in claim 5 wherein the plurality of lift pads comprises a ring having a central aperture therein forming an inner cylindrical surface adapted to be disposed around said shaft, adjacent lift pads being separated by longitudinally extending channels, said lift pads having a recess disposed therein, the cross-sectional shape of the lift pad defined from a radial direction with respect to said aperture, comprising a rectangular cross-section with a smaller cut-out cross-section having one of its edges in common with longitudinally extending channels, said smaller cut-out cross-section not bordering on any of the corners of said rectangular section.

7. A high-speed, self-acting shaft seal as recited in claim 2 wherein said dam seal has disposed therein a channel of a cross-sectional shape defined from a radial direction with respect to said aperture comprising:
   a rectangle with a smaller cut-out cross-section having one of its edges in common with said axially extending channel;
   said smaller cut-out cross-section not bordering on any of the corners of said rectangle; and
   said channel being coupled to said helical groove by a port.

8. A high-speed, self-acting shaft seal as recited in claim 3 wherein said dam seal has disposed therein a channel of a cross-sectional shape defined from a radial direction with respect to said aperture comprising:
   a rectangle with a smaller cut-out cross-section having one of its edges in common with said inner cylindrical surface of said dam seal;
   said smaller cut-out cross-section not bordering on any of the corners of said rectangle; and
   said channel being coupled to said helical groove by a port.

9. A high-speed, self-acting shaft as recited in claim 5 wherein said dam seal has disposed therein a channel of a cross-sectional shape defined from a radial direction with respect to said aperture comprising:
   a rectangle with a smaller cut-out section having one of its edges in common with said inner cylindrical surface of said dam seal;
   said smaller cut-out cross-section not bordering on any of the corners of said rectangle; and
   said channel being coupled to said helical groove by a port.

* * * * *